(12) United States Patent
Zager et al.

(10) Patent No.: US 8,549,129 B2
(45) Date of Patent: Oct. 1, 2013

(54) LIVE MIGRATION METHOD FOR LARGE-SCALE IT MANAGEMENT SYSTEMS

(75) Inventors: Eric Louis Zager, Seattle, WA (US);
Miho Urabe, Woodinville, WA (US);
Leyu Feng, Shanghai (CN); Huajun Luo, Shanghai (CN); Jun Ma, Shanghai (CN); Yanfeng Cui, Shanghai (CN);
Jeroen van Eesteren, Bellevue, WA (US); David C. James, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 431 days.

(21) Appl. No.: 12/902,464

(22) Filed: Oct. 12, 2010

(65) Prior Publication Data

US 2012/0089711 A1   Apr. 12, 2012

(51) Int. Cl.
*G06F 15/173* (2006.01)

(52) U.S. Cl.
USPC ............ 709/223; 709/203; 709/224; 719/318

(58) Field of Classification Search
USPC ................. 709/218, 219, 221, 223, 224, 220;
719/318, 328, 330, 317; 718/106; 706/19;
370/252, 254; 707/792
See application file for complete search history.

(56) References Cited

U.S. PATENT DOCUMENTS

| | | | |
|---|---|---|---|
| 7,269,612 B2 * | 9/2007 | Devarakonda et al. ....... 707/694 |
| 7,509,327 B2 | 3/2009 | Joshi | |
| 7,512,769 B1 | 3/2009 | Lowell | |
| 7,571,349 B2 | 8/2009 | Levidow | |
| 8,127,092 B2 * | 2/2012 | Nakajima et al. ............. 711/154 |
| 8,341,251 B2 * | 12/2012 | Gao et al. ...................... 709/222 |
| 2003/0179716 A1 * | 9/2003 | Liu .............................. 370/254 |
| 2007/0180436 A1 | 8/2007 | Travostino | |
| 2007/0198664 A1 * | 8/2007 | Satkunanathan et al. ..... 709/220 |
| 2007/0198797 A1 * | 8/2007 | Kavuri et al. ................. 711/165 |
| 2008/0270515 A1 | 10/2008 | Chen | |
| 2010/0082922 A1 | 4/2010 | George | |
| 2010/0223217 A1 * | 9/2010 | Little .............................. 706/19 |
| 2011/0022711 A1 * | 1/2011 | Cohn ........................... 709/225 |

OTHER PUBLICATIONS

Zamfir, Cristian—Live Migration of User Environments Across Wide Area Networks—Published Date: 2008 http://theses.gla.ac.uk/887/01/2008zamfirmsc.pdf.
Lu, Chenyang,—Aqueduct: online data migration with performance guarantees—Published Date: Jan. 30, 2002 http://citeseerx.ist.psu.edu/viewdoc/download?doi=10.1.1.63.699&rep=rep1&type=pdf.
Rabinovich, Michael—A Dynamic Object Replication and Migration Protocol for an Internet Hosting Service—Published Date: 1999 http://citeseerx.ist.psu.edu/viewdoc/download?doi=10.1.1.57.3366&rep=rep1&type=pdf.

* cited by examiner

*Primary Examiner* — Frantz Jean
(74) *Attorney, Agent, or Firm* — Workman Nydegger (57) ABSTRACT

Migrating services and clients from a legacy topology to a new topology. A method includes receiving user input selecting a first client managed by a first configuration management system to migrate to a second configuration management system. Dependencies of the first client are determined, including determining services on which the first client depends to function in a topology. The dependencies of the first client including services and their data on which the first client depends to function in a topology are migrated to a second configuration management system or an administrator is alerted to the dependencies of the first client including services and their data on which the first client depends to function in a topology.

21 Claims, 7 Drawing Sheets

Figure 3
Migration Data Flow

Figure 4
Client Data Flow

LIVE MIGRATION METHOD FOR LARGE-SCALE IT MANAGEMENT SYSTEMS

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system. Large enterprise systems can be created by interconnecting various smaller systems such as server systems providing services and client systems that access the services.

Within the large enterprise systems, there is often a desire to have centralized control and/or reporting of clients and services. To accomplish this, a configuration management system may be used to monitor and control clients, services and devices. For example, System Center Configuration Manager® available from Microsoft Corporation of Redmond Wash. assesses, deploys, and updates servers, client computers, and devices across physical, virtual, distributed, and mobile environments.

Computing functionality and technology advances at an incredible pace. Thus, there is often a need or desire to use new configuration management systems. Moving users and services to new configuration management systems is often referred to as "migration." Migration of users often involves moving clients, services, and devices. from a legacy system to a new system that will replace the legacy system. In particular, metadata about clients, services, and devices is moved from one configuration management system to a new configuration management system. There are at least three factors to consider in a migration scenario: service availability, risk control and cost saving.

Service availability and cost saving are typically conflicting factors. Illustrating now the extremes, one design can maximize the service availability by setting up an entire new system before starting migration. Alternatively, all services can be stopped during migration to save on cost.

To minimize the risk, the legacy system should keep functioning for some period of time after the migration has completed which also increases the hardware and maintenance cost. However, the risk of stopping all services for migration may be unacceptable in some cases.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method of migrating services and clients from a legacy topology to a new topology. The method includes receiving user input selecting a first client managed by a first configuration management system to migrate to a second configuration management system. Dependencies of the first client are determined, including determining services on which the first client depends to function in a topology. The dependencies of the first client including services and their data on which the first client depends to function in a topology are migrated to a second configuration management system or an administrator is alerted to the dependencies of the first client including services on and their data which the first client depends to function in a topology.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments balance cost and service availability by layering data and services and using different strategies for migrating data and/or services in different layers. Strategies can be used to enable undo/redo, or reverse migration scenarios for client migration so that risk is minimized without the need to duplicate hardware and administration costs. Examples illustrated herein are based on the System Center Configuration Manager® available from Microsoft® corporation of Redmond Wash., but the concepts can be applied to various different topologies and systems.

Figure 1:
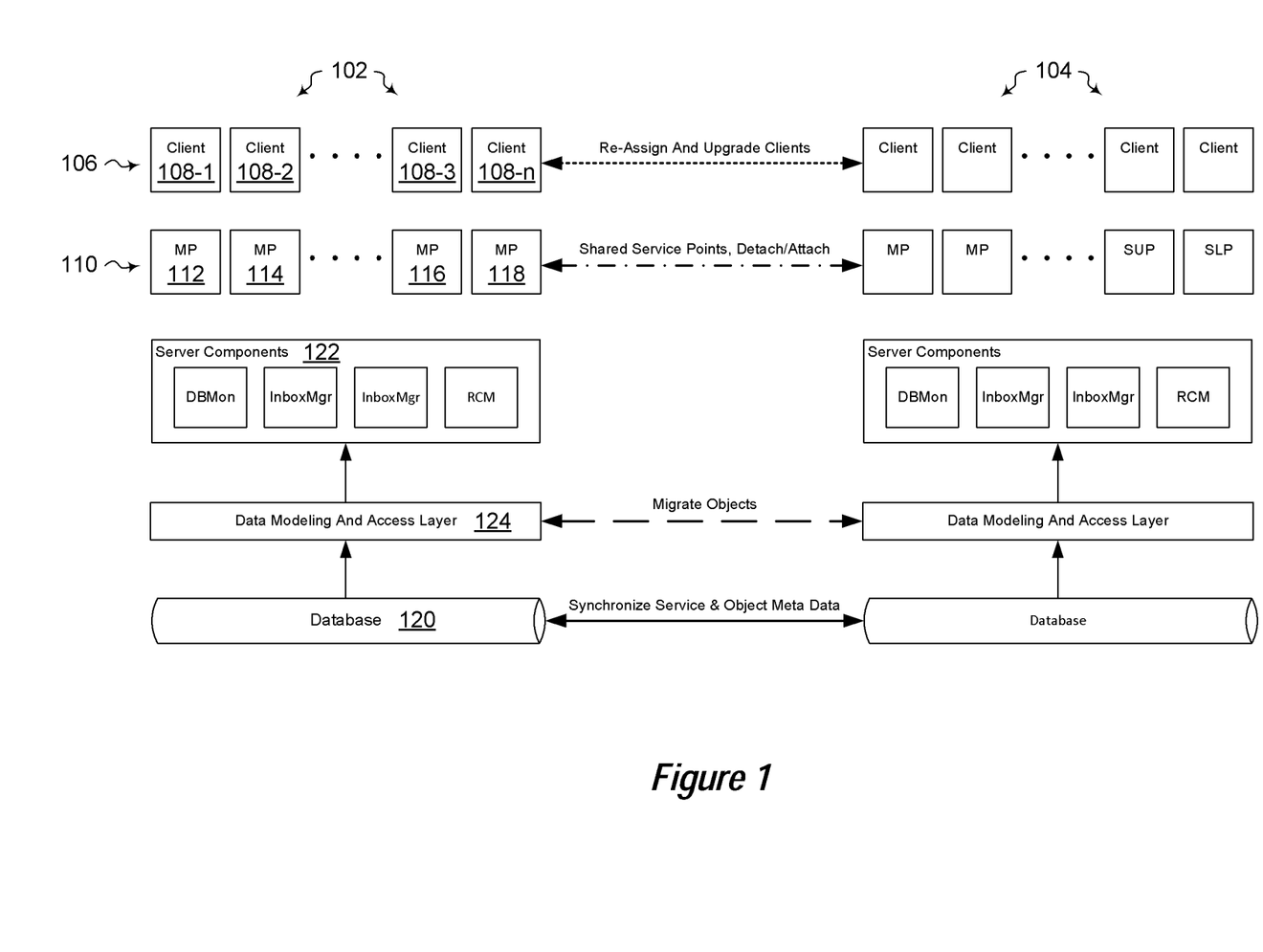
FIG. 1 illustrates migration of clients and services from a first topology to a second topology.

Referring now to FIG. 1, an enterprise legacy topology 102 managed by a configuration management system is illustrated. The enterprise topology 102, in the example illustrated is being migrated, in whole or in part, to the new enterprise topology 104 managed by a new configuration management system. New as used herein does not necessarily provide any sort of commentary or limitations on a system other than a distinguishing identification. For example, a new system may be described as such simply to distinguish from a legacy system. Further, legacy, as used herein, is also simply a distinguishing identification. Thus, while embodiments describe movement from a legacy topology to a new topology, the new topology may be an older topology than the legacy topology in spite of the designators assigned to the topologies. The topology 102 includes various layers. In particular, the topology 102 includes two types of layers: service layers and data layers.

Within the service layer are a client layer, a core services layer, and a content distribution service layer. The client layer 106 includes the clients (illustrated specifically at 108-1, 108-2, 108-3, and 108-n, but referred to herein generally as 108) in the topology 102. The clients 108 may be computing systems that are configured to access services in the topology 102. A client 108 may be configured to access one or more of the services. In particular, some clients 108 may be able to access virtually any service in the topology 102, while other clients are limited, such as by policy, functionality, or otherwise, to a limited set of services including less than all of the services in the topology 102.

The core services layer 110 includes services that are accessible by clients. In the example illustrated in FIG. 1, the services layer 110 includes a management point 112, a software update point 116 and a server locator point 118. While the embodiment illustrated in FIG. 1 shows single examples of these services, it should be appreciated that embodiments may include multiple instances of each service. The core services layer may include basic services that are included in a topology for the topology to function, including: a management point, a software update point and a server locator point.

Within a site topology, in the embodiments illustrated, a default management point may be specified. Management points can be set to use the site database 120 or a replicated copy of the site database. The site database 120 contains service and object metadata. Management points can be, for example, a single physical server. Alternatively, a management point may be a single virtual server (including multiple physical servers) that is accessed via a network load balancer. A management point may do one or more of the following: provide specific client configuration details for clients after installation; create the appropriate client policy for clients; store retrieved policies locally; serve as the location where client computers check for advertisements; locate distribution points for clients; receive inventory, software metering, and status information from clients and forward the information to a site server, etc.

In one embodiment, a distribution point stores files for packages to run on client computers. These distribution points function as distribution centers for the files that a package uses, allowing users to download and run these files, programs, and scripts when a package is advertised.

In one embodiment, a software update point 116 interacts with the various update services to configure update settings, to request synchronization to the upstream update source, and on the central site, to synchronize software updates from the update service databases to the site server database 120.

In one embodiment, a server locator point 118 is used in a topology to complete client site assignment on an intranet and help clients find management points when they cannot otherwise find that information.

The content distribution services layer includes functionality for content distribution. The content distribution services layer is included as part of the server components and includes for example, a standard distribution point, a server share distribution point, a branch office distribution point, an internet facing distribution point, and application virtualization streaming enabled distribution point and/or a multicast-enabled distribution point.

Embodiments may further implement a data layer. The data layer may include a database layer, a storage layer, an extraction layer and a presentation layer. The data layer includes metadata about a site topology and provides functionality for gathering and presenting such data. The metadata about the site topology may be included the database layer illustrated by the database 120. An extraction layer collects metadata from the database 120 and presents it to the presentation layer also illustrated as the data modeling and access layer 124 in FIG. 1. The modeled data can then be illustrated on an administrator console user interface where an administrator can view the modeled data and interact with the modeled data to make changes to a topology.

As noted, embodiments may include functionality for migrating the topology illustrated at 102 to the topology illustrated at 104. For example, in some embodiments, configuration management systems may include a migration component with modules configured to migrate services and clients from other configuration management systems to the management system. Migration may be performed in a fashion that balances service availability, risk control and cost. In some embodiments, this can be accomplished by carefully selecting which clients and services to migrate, and migrating them based on dependency relationships.

Figure 2:
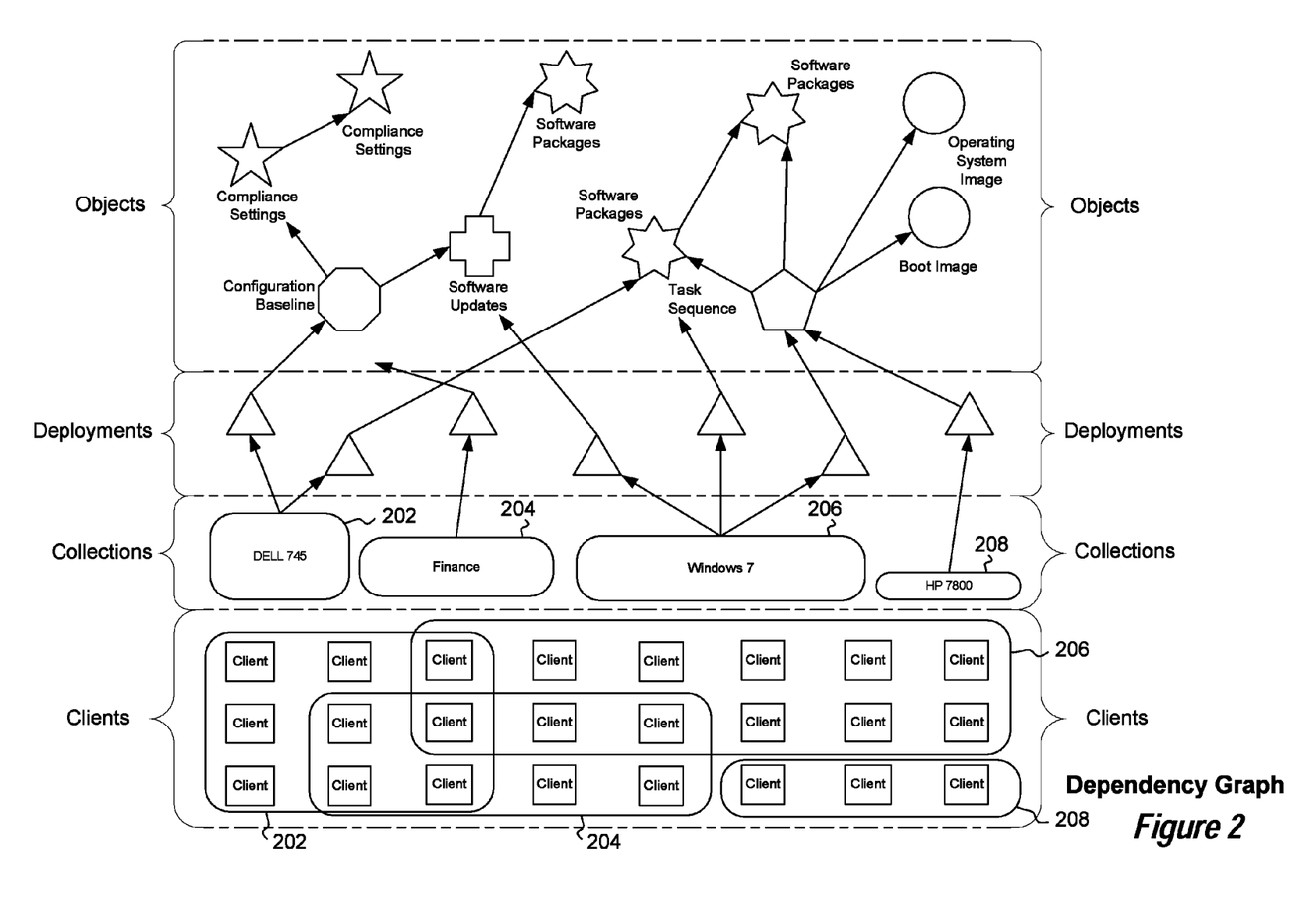
FIG. 2 illustrates a dependency calculation.

In particular, embodiments may be implemented where a user, such as a network administrator, can select a collection of clients. Embodiments may include computer implemented modules that based on the collection of clients can calculate dependencies. In particular, certain clients require certain services to be available to function properly. Additionally, a topology, including a configuration management system, has certain services, such as core services and dependant services, available for the configuration management system to function properly for a particular set of clients. Thus, embodiments can determine based on the selected collection of clients which services are to be migrated to enable appropriate functionality to be implemented at a new site topology such as the site topology 104. Reference is now made to FIG. 2, which illustrates this functionality. In particular, FIG. 2 illustrates a plurality of clients. FIG. 2 further illustrates a first collection of clients 202, a second collection of clients 204, a third collection of clients 206 and a fourth collection of clients 208, where the collection defines a common feature or characteristic for clients in the collection of clients.

For example, a client may belong to a collection as a result of hardware on which the client is running as illustrated by the collections of clients 202 and 208. Alternatively, a client may belong to a collection as a result of the overall use of the client, such as is illustrated for the collection of clients 204. Alternatively, a client may belong to a collection as a result of the operating system on which the client is running as illustrated by the collection of clients 206. Other hardware, software, user, or other characteristics may be used to define collections of clients as well, although not specifically enumerated here.

FIG. 2 illustrates dependency calculations that are performed for clients selected by a user. In particular, in FIG. 2 a user selects a set of clients. If the set of clients includes clients from the collection 202 then the dependencies emanating from the collection 202 will be calculated. Similarly, if the set of clients selected by a user includes clients from the collection 204, then the dependencies emanating from the collection 202 will be calculated. Similar analysis is performed for collections 206 and 208.

Figure 3:
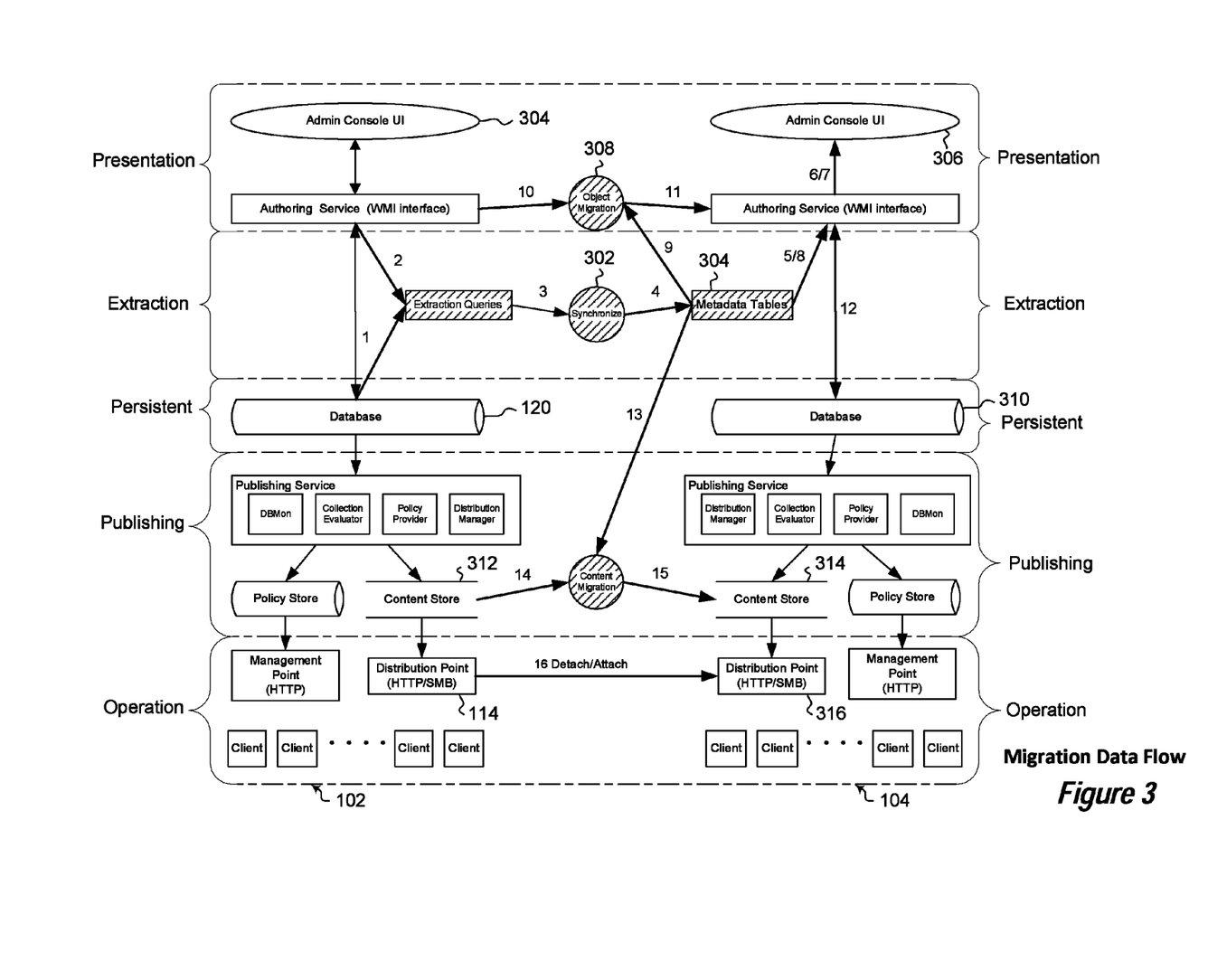
FIG. 3 illustrates migration of services from a first topology to a second topology.

Referring now to FIG. 3, a migration data flow is shown. In particular, the migration data flow illustrated in FIG. 3 illustrates various acts by modules within configuration management systems and various interactions of administrators with migration systems. In particular, FIG. 3 illustrates a version of the topology 102 using a legacy configuration management system being migrated to a version of the topology 104 illustrated in FIG. 1 with a new configuration management system.

Referring now to FIG. 3, at step 1, the migration system determines what objects exist in the topology 102 and what objects each object depends on to function properly. Thus any migrated object can be migrated with objects on which it depends so that the migrated object can function properly in the new topology 104.

FIG. 3 further illustrates at 2 acts performed by the configuration management system of the legacy topology 102 for finding deleted objects. By finding deleted objects embodiments may perform minimization operations to reduce the size of the migration. In particular, embodiments may be configured to migrate only the data that are in use while rendering obsolete the unused data as part of the migration.

FIG. 3 illustrates at 3 acts for reading object metadata to a synchronization component 302. At 4 acts for inserting or updating metadata tables 304 are shown. This ensures that the metadata between the topology 102 and the topology 104 is consistent. Further, synchronizing the metadata of objects and clients allows administrators to direct migration tasks and monitor the migration progress in one place without switching between the different administrative console user interfaces or tools. For example, FIG. 3 illustrates an administrator console user interface 304 for the legacy configuration management system of the topology 102 and an administrator console user interface 306 for the new configuration management system of the topology 104. Synchronizing metadata between the legacy topology 102 and the new topology 104 allows either administrator console user interface 304 or 306 to be used. With these metadata in the new system topology 104 from synchronizing the client and object metadata from the legacy system topology 102 to the new system topology 104, administrators can do planning before migration starts and also monitor the progress of the migration At 5, FIG. 3 illustrates reading object information from metadata tables 304. This may include reading information about objects and their relationships, including dependencies. At 6, embodiments present representations of the objects and relationships, including dependencies, to a user and an administrative console user interface 306 of the new configuration management system. At 7, a user, interacting with the administrative console user interface 306, can select what object(s) they want to migrate. Based on the user input, FIG. 3 illustrates at 8 creating one or more migration jobs to accomplish the user's migration selections. At 9 the migration job(s) are run at a scheduled time. At 10 all object data is loaded to a migration component 308. At 11 the object data is saved to the new system topology 104. At 12 the data is saved specifically into a database 310 of the new system topology 104.

At 13 content starts to be migrated. At 14 content from content store 312 of the legacy system topology 102 is copied. At 15 the content is saved into a content store 314 of new system topology 104. At 16 a distribution point 114 is detached from legacy system topology 102 and attached to the new system topology 104.

Steps 1-4 are performed at a lower level to get better performance, while steps 10-11 are at a higher level to get data integrity. Higher level means that data is accessed through an SDK provider as a proxy. The SDK provider reads data from a query interface, such as SQL. When reading data, the SDK provider will remove the secrets. When writing, the SDK provider will do data validation. Lower level accesses access a database directly. Lower level accesses can read the secrets. However there is no data validation. As such, lower level is used to read metadata, where high level is used during migration primarily for data validation. Lower level accesses may also be used to migrate secrets. Using the illustrated workflow of FIG. 3 at acts 14 and 15, a distribution manager does not need to process content of migrated objects. Additionally at 16, the distribution manager does not need to publish content to the migrated distribution point 316.

Figure 4:
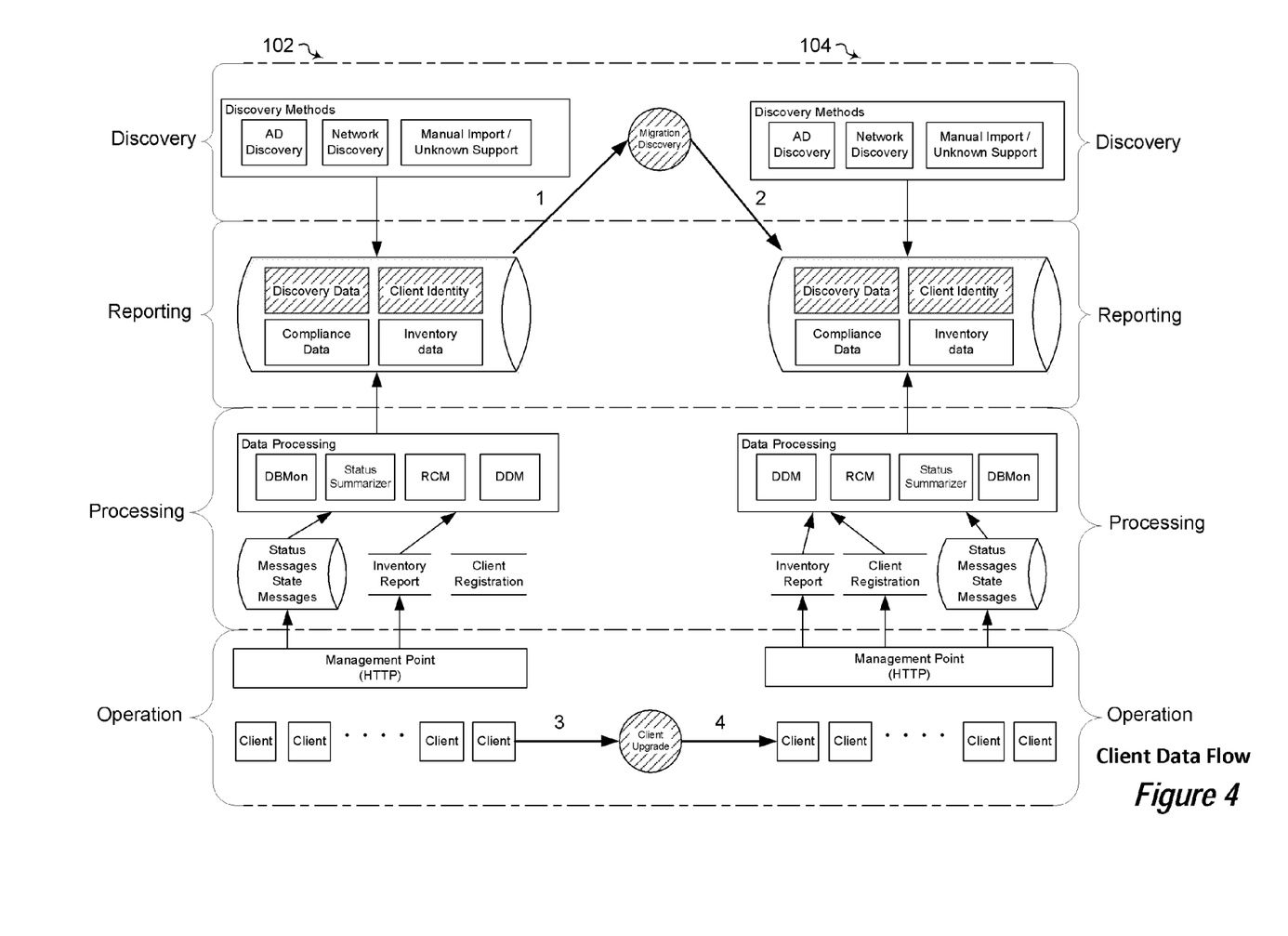
FIG. 4 illustrates migration of clients from a first topology to a second topology.

FIG. 4 illustrates client dataflow. At 1, a migration read is performed to read client identities and discovery data from legacy system topology 102. At 2, a migration write is performed to write client identity and discovery data to the new system topology 104. At 3 clients are upgraded to a new version and at 4 attached to the new system topology 104. Steps 1 and 2 ensure the security of the client migration. At step 3, embodiments may be implemented where client deployment data is kept during the upgrade and can be used directly with a new version of a client. Further, at step 3, embodiments may be practiced where the client inventory data and compliance data will be reported to a site server of the new system topology 104 after a client is upgraded. As such, they may be no need to migrate those data from a site server of the legacy system topology 102.

Embodiments may be particularly suited for large interconnected systems. For example, some embodiments may be applied in enterprise topologies on the order of 10s of server roles, 100s of service points, and 1,000's of clients.

Embodiments may be implemented where services are shared between the legacy system topology 102 and the new system topology 104. This allows client migration to be easily undone by assigning the clients back to the legacy system topology 102. In contrast, many traditional migration processes require a user to either duplicate all the services or shutdown the services during migration. Whereas embodiments described herein may synchronize the services definition between the legacy system topology 102 and the new system topology so that clients 108 migrated to the new system topology 104 can share the services in the legacy system topology 102 and clients 108 in the legacy system topology 102 can share the services provided by the new system topology 104.

Some embodiments may use standard based protocols for the object migration. As such, objects can be migrated to different configuration management systems supplied by different providers. For example, embodiments may be used to migrate from System Center Configuration Manager® (SCCM) system to non-SCCM systems and from non-SCCM systems to SCCM systems.

As noted previously, in many migration scenarios of previous systems, all data are migrated including data that are not used anymore. However, some embodiments described herein may discover and migrate only the data that are in use only while rendering obsolete the unused data. In some embodiments, this may be facilitated by using a defined protocol using OOXML & REST (Open Office Xml & Representational State Transfer) to store and organize the objects and automatically discover the data dependencies.

In the specific example illustrated above, there is only a single site role called distribution point, but the distribution point can be configured to support various functions. The following describes the configurations can be applied to distribution points:

Server and server share distribution point. This configuration determines how a configuration management system creates and writes the packages and support files for the distribution point role.

Standard and branch distribution point. Branch distribution points are optimized for remote branch offices with limited connectivity. Any distribution point not configured as a branch distribution point is a standard distribution point.

BITS-enabled distribution point. This configuration allows clients to download content from the distribution point using Background Intelligent Transfer Service (BITS) to provide bandwidth throttling.

Protected distribution point. Site systems hosting the distribution point and state migration point roles can be protected to prevent clients outside designated boundaries from accessing the site system.

Mobile device distribution point. This configuration enables mobile device clients to download content from the distribution point.

Distribution point supporting Internet-based clients. This configuration accepts connections from clients using the Internet fully qualified domain name for the site system.

Application Virtualization streaming-enabled distribution point. This configuration allows streaming virtual applications to software distribution clients.

Multicast-enabled distribution point. This configuration uses multicast to distribute operating systems The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
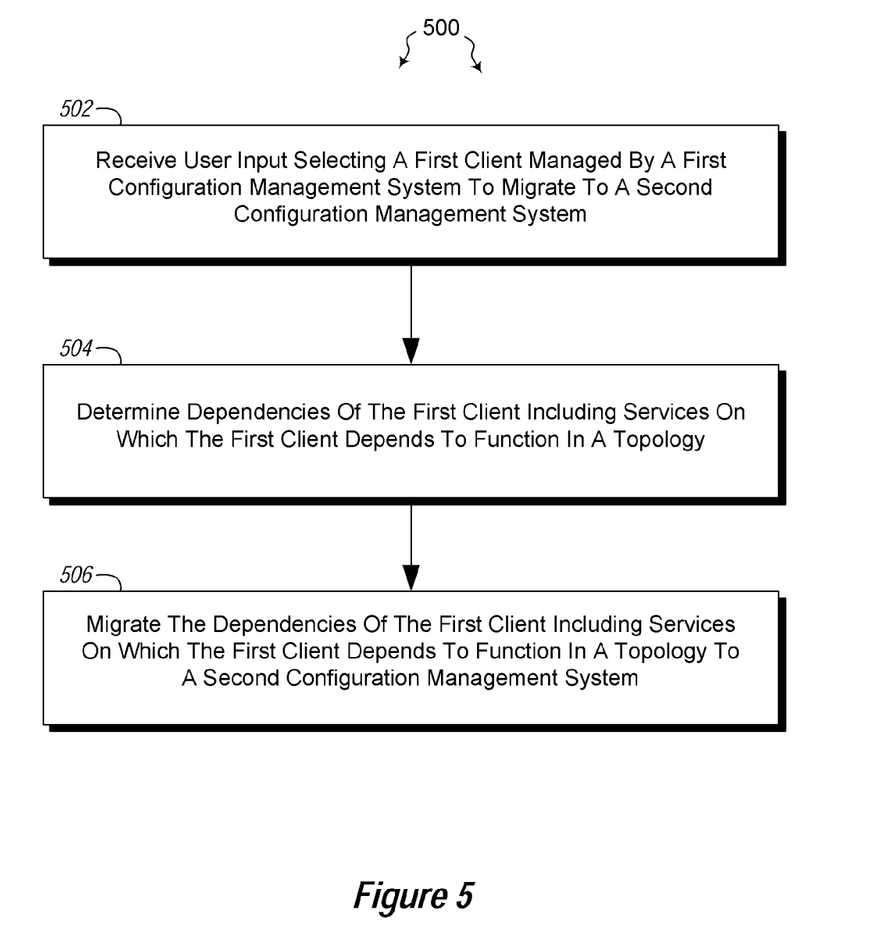
FIG. 5 illustrates a method including acts for migrating services and clients from a legacy topology to a new topology.

Referring now to FIG. 5, a method 500 is illustrated. The method 500 includes acts for migrating services and clients from a legacy topology to a new topology, the method 500 includes receiving user input selecting a first client managed by a first configuration management system to migrate to a second configuration management system (act 502). For example, a configuration management system may include migration functionality including a user interface which allows a user to select clients and services to migrate. For example, FIG. 3 illustrates that metadata about objects in a first topology 102 managed by a first configuration management system are migrated to metadata tables 304 for a second configuration management system for a second topology 104. An administrator user console user interface 306 can then be used to select objects from the first topology based on the metadata in the metadata tables 304, such as for example a first client to be migrated.

The method 500 further includes determining dependencies of the first client including services and their data on which the first client depends to function in a topology (act 504). For example, FIG. 2 illustrates a determination of dependent objects based on client selection. Some clients depend on some objects. Objects can also depend on other objects. Thus determining dependencies of a client may recursively add the dependency of the objects that the client directly depends.

The method 500 further includes migrating the dependencies of the first client including services and their data on which the first client depends to function in a topology to a second configuration management system (act 506). For example, FIG. 3 illustrates migration at acts 14 and 15.

The method 500 may be performed where migrating the dependencies of the first client includes creating one or more migration jobs for migrating the dependencies, and executing the one or more migration jobs to migrate services from the first configuration management system to the second configuration management system. In particular, embodiments may be implemented where jobs can be stored to one or more job migration queues. Migration tasks can then be performed based on jobs in a job migration queue The method 500 may further include, after migrating the dependencies of the first client, then migrating the client to the second configuration management system. For example, FIG. 3 illustrates an example where dependencies are migrated, whereas FIG. 4 illustrates an example of client migration. Embodiments may be implemented where migration processes similar to those shown in FIG. 3 are performed prior to the migration processes shown in FIG. 4. Some embodiments may further include, after migrating the client to the second configuration management system, then migrating one or more additional services not identified in the act of determining dependencies of the first client. For example some core services may be migrated first to allow clients to be migrated, with other services being migrated at a later time.

As noted above, the method 500 may further include identifying core services that are a basic set of services needed for a topology to function, and migrating the core services from the first configuration management system to the second configuration management system.

The method 500 may further include determining that one or more services managed by the first configuration management system are obsolete and as a result preventing the obsolete services from being migrated to the second configuration management system. In particular, embodiments may identify services that are not being used and thus reduce overhead and management resources by preventing such services from being migrated.

The method 500 may be performed where acts for determining dependencies of the first client are performed at a low level to improve migration performance.

The method 500 may be performed where acts for migrating the dependencies of the first client are performed at high level to improve data integrity.

The method 500 may further include synchronizing object metadata for the dependencies between the first and second configuration management systems allowing administrators to monitor services or clients at one console or tool without the need to switch between consoles or tools for the different configuration management systems. For example, as illustrated in FIG. 3, synchronization illustrated at 302 allows the Administrator console user interface 306 to be used to view clients and services in the first topology 102 and to migrate clients and services from the first topology 102 to the second topology 104. In addition, synchronizing may also enable planning and monitoring of the migration progress. For example, display a dashboard of total vs. migrated clients, and total vs. migrated objects. A system can discover and display objects modified since an earlier migration. The user can create and schedule the migration job.

The method 500 may further include allowing one or more services to continue to be managed by the first configuration management system after migrating to the second configuration management system, thus sharing services between topologies. Once the first system is decommissioned, the service will be attached to and managed by the second system. The second system will upgrade the program of the service but keep and reuse the data of the service. In the case of distribution points, the software contents like installer packages (e.g. MSI packages) and OS images will be reused but the program that provides the multicast and streaming will be upgraded to a new version.

Figure 6:
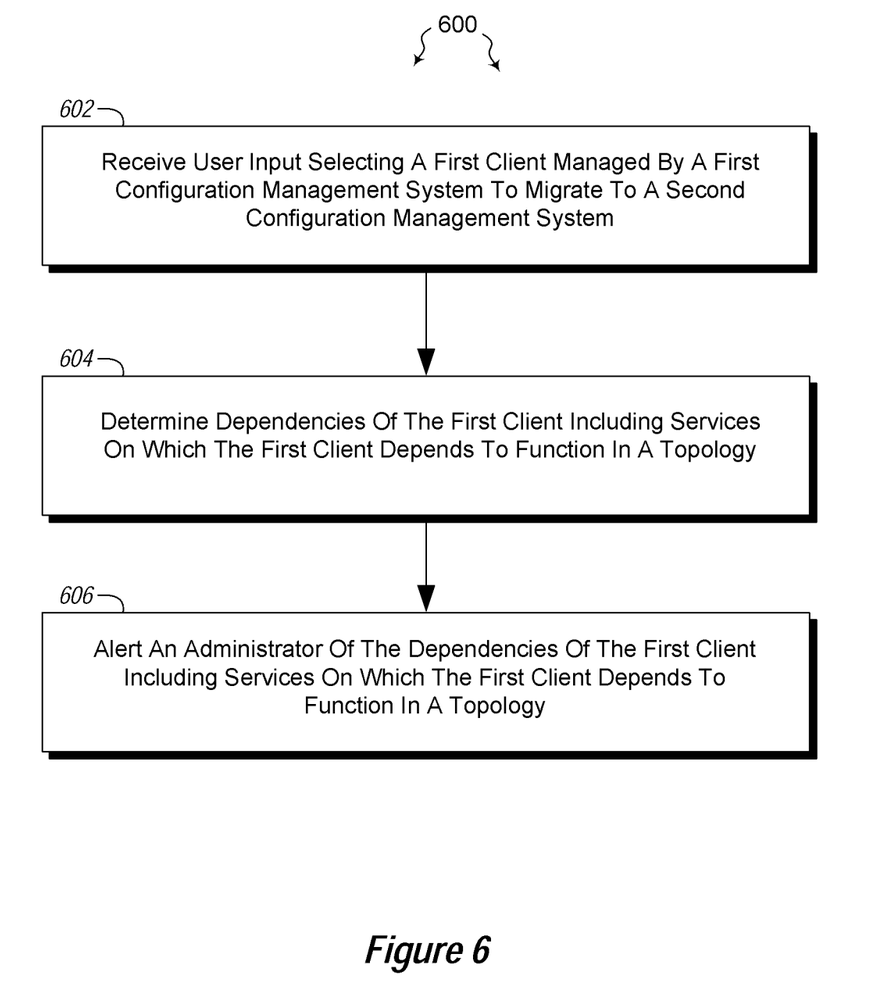
FIG. 6 illustrates another method including acts for migrating services and clients from a legacy topology to a new topology.

Referring now to FIG. 6, a method 600 is illustrated. The method 600 includes acts for migrating services and clients from a legacy topology to a new topology, the method 600 includes receiving user input selecting a first client managed by a first configuration management system to migrate to a second configuration management system (act 602);

The method 600 further includes determining dependencies of the first client including services and their data on which the first client depends to function in a topology (act 604);

The method 600 further includes alerting an administrator of the dependencies of the first client including services and their data on which the first client depends to function in a topology (act 606). Thus, in this embodiment, an administrator may be notified, such as through one of the administrator console user interfaces 304 and/or 306 of the dependencies. For example, a dependency map similar to that illustrated in FIG. 2, or some other representation may be shown.

Figure 7:
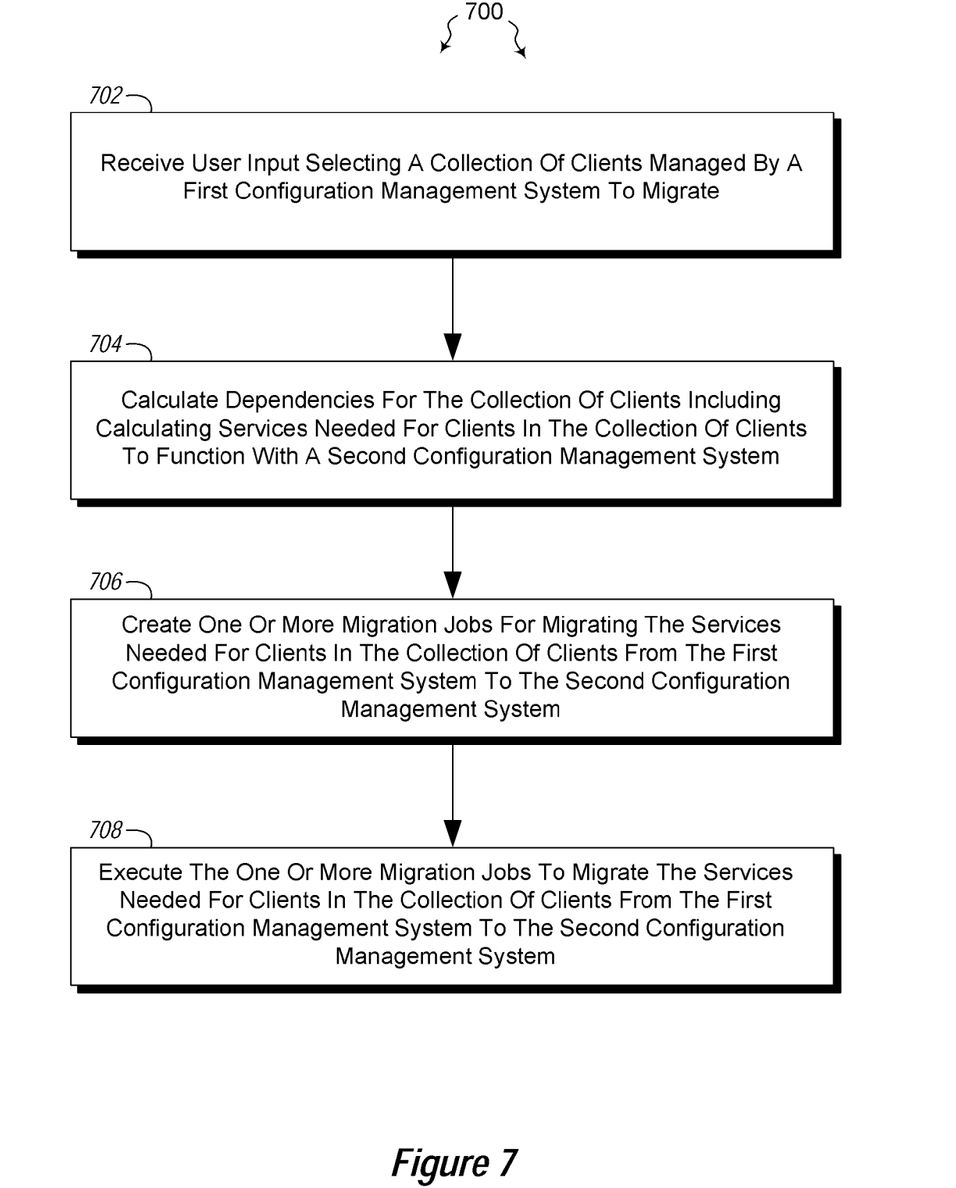
FIG. 7 illustrates another method including acts for migrating services and clients from a legacy topology to a new topology.

Referring now to FIG. 7, a method 700 is illustrated. The method 700 includes acts for method of migrating services and clients from a legacy topology to a new topology, the method 700 includes receiving user input selecting a collection of clients managed by a first configuration management system to migrate (702);

The method 700 further includes calculating dependencies for the collection of clients including calculating services needed for clients in the collection of clients to function with a second configuration management system (704).

The method 700 further includes creating one or more migration jobs for migrating the services needed for clients in the collection of clients from the first configuration management system to the second configuration management system (706).

The method 700 further includes executing the one or more migration jobs to migrate the services needed for clients in the collection of clients from the first configuration management system to the second configuration management system (708).

The method 700 may further include, after all of the services needed for clients in the collection of clients have been migrated to the second configuration management system, then migrating the clients in the collection of clients to the second configuration management system.

The method 700 may further include, after at least a portion of the clients in the collection of clients have been migrated to the second configuration management system, then migrating one or more additional services not identified in the act of calculating dependencies for the collection of clients.

The method 700 may further include identifying core services that are a basic set of services needed for a topology to function, and creating one or more migration jobs for migrating the core services from the first configuration management system to the second configuration management system.

The method 700 may further include determining that one or more services managed by the first configuration management system are obsolete and as a result preventing the obsolete services from being migrated to the second configuration management system.

The method 700 may be practiced where acts for calculating dependencies are performed at a low level to improve migration performance.

The method 700 may be practiced where acts for executing the one or more migration jobs to migrate the services needed for clients in the collection of clients from the first configuration management system to the second configuration management system are performed at high level to improve data integrity.

The method 700 may further include synchronizing object metadata for the services between the first and second configuration management systems allowing administrators to monitor services or clients at one console or tool without the need to switch between consoles or tools for the different configuration management systems.

The method 700 may further include allowing one or more services to continue to be managed by the first configuration management system after migrating to the second configuration management system, thus sharing services between topologies.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer implemented method of migrating services and clients from a legacy topology to a new topology, the method comprising:
   receiving user input selecting a first client managed by a first configuration management system to migrate to a second configuration management system;
   determining dependencies of the first client including services and their data on which the first client depends to function in a topology;
   migrating the dependencies of the first client including services and their data on which the first client depends to function in a topology to the second configuration management system; and
   allowing one or more services to continue to be managed by the first configuration management system after migrating to the second configuration management system, thus sharing services between topologies.

2. The method of claim 1 wherein migrating the dependencies of the first client comprises:
   creating one or more migration jobs for migrating the dependencies; and
   executing the one or more migration jobs to migrate services from the first configuration management system to the second configuration management system.

3. The method of claim 1 further comprising, after migrating the dependencies of the first client, then migrating the client to the second configuration management system.

4. The method of claim 3 further comprising, after migrating the client to the second configuration management system, then migrating one or more additional services not identified in the act of determining dependencies of the first client.

5. The method of claim 1 further comprising:
   identifying core services that are a basic set of services needed for a topology to function, and
   migrating the core services from the first configuration management system to the second configuration management system.

6. The method of claim 1 further comprising determining that one or more services managed by the first configuration management system are obsolete and as a result preventing the obsolete services from being migrated to the second configuration management system.

7. The method of claim 1 wherein acts for determining dependencies of the first client are performed at a low level to improve migration performance.

8. The method of claim 1 wherein acts for migrating the dependencies of the first client are performed at high level to improve data integrity.

9. The method of claim 1 further comprising synchronizing object metadata for the dependencies between the first and second configuration management systems allowing administrators to monitor services or clients at one console or tool without the need to switch between consoles or tools for the different configuration management systems.

10. The method of claim 1, wherein the method includes:
    alerting the administrator of the dependencies of the first client including services and their data on which the first client depends to function in the topology.

11. A computer implemented method of migrating services and clients from a legacy topology to a new topology, the method comprising:
    receiving user input selecting a collection of clients managed by a first configuration management system to migrate;
    calculating dependencies for the collection of clients including calculating services needed for clients in the collection of clients to function with a second configuration management system;
    creating one or more migration jobs for migrating the services needed for clients in the collection of clients from the first configuration management system to the second configuration management system;
    executing the one or more migration jobs to migrate the services needed for clients in the collection of clients from the first configuration management system to the second configuration management system; and
    allowing one or more services to continue to be managed by the first configuration management system after migrating to the second configuration management system, thus sharing services between topologies.

12. The method of claim 11 further comprising, after all of the services needed for clients in the collection of clients have been migrated to the second configuration management system, then migrating the clients in the collection of clients to the second configuration management system.

13. The method of claim 12 further comprising, after at least a portion of the clients in the collection of clients have been migrated to the second configuration management system, then migrating one or more additional services not identified in the act of calculating dependencies for the collection of clients.

14. The method of claim 11 further comprising:
identifying core services that are a basic set of services needed for a topology to function, and
creating one or more migration jobs for migrating the core services from the first configuration management system to the second configuration management system.

15. The method of claim 11 further comprising determining that one or more services managed by the first configuration management system are obsolete and as a result preventing the obsolete services from being migrated to the second configuration management system.

16. The method of claim 11 wherein acts for calculating dependencies are performed at a low level to improve migration performance.

17. The method of claim 11 wherein acts for executing the one or more migration jobs to migrate the services needed for clients in the collection of clients from the first configuration management system to the second configuration management system are performed at high level to improve data integrity.

18. The method of claim 11 further comprising synchronizing object metadata for the services between the first and second configuration management systems allowing administrators to monitor services or clients at one console or tool without the need to switch between consoles or tools for the different configuration management systems.

19. A computing system comprising:
at least one processor; and
system memory storing computer-executable instructions which, when executed by the at least one processor, implement a method of migrating services and clients from a legacy topology to a new topology, the method comprising:
receiving user input selecting a first set of one or more clients from a plurality of clients managed by a first configuration management system to migrate to a second configuration management system;
based upon the selection of the first set of one or more clients, determining the dependencies of the first set of one or more clients that are required for the first set of one or more clients to function properly, the dependencies including services and their data on which each of the one or more clients in the first set depends to function properly; and
migrating the dependencies of the first client including services and their data on which the first client depends to the second configuration management system,
wherein the determining the dependencies is performed at a low level while the migrating is performed at a high level.

20. The computing system of claim 19, wherein the migration is performed while refraining from migrating data that is not in use.

21. The computing system of claim 19, wherein the performing of migration at the high level includes performing data validation and wherein performing the determining at the low level is performed without data validation.

* * * * *